UNITED STATES PATENT OFFICE.

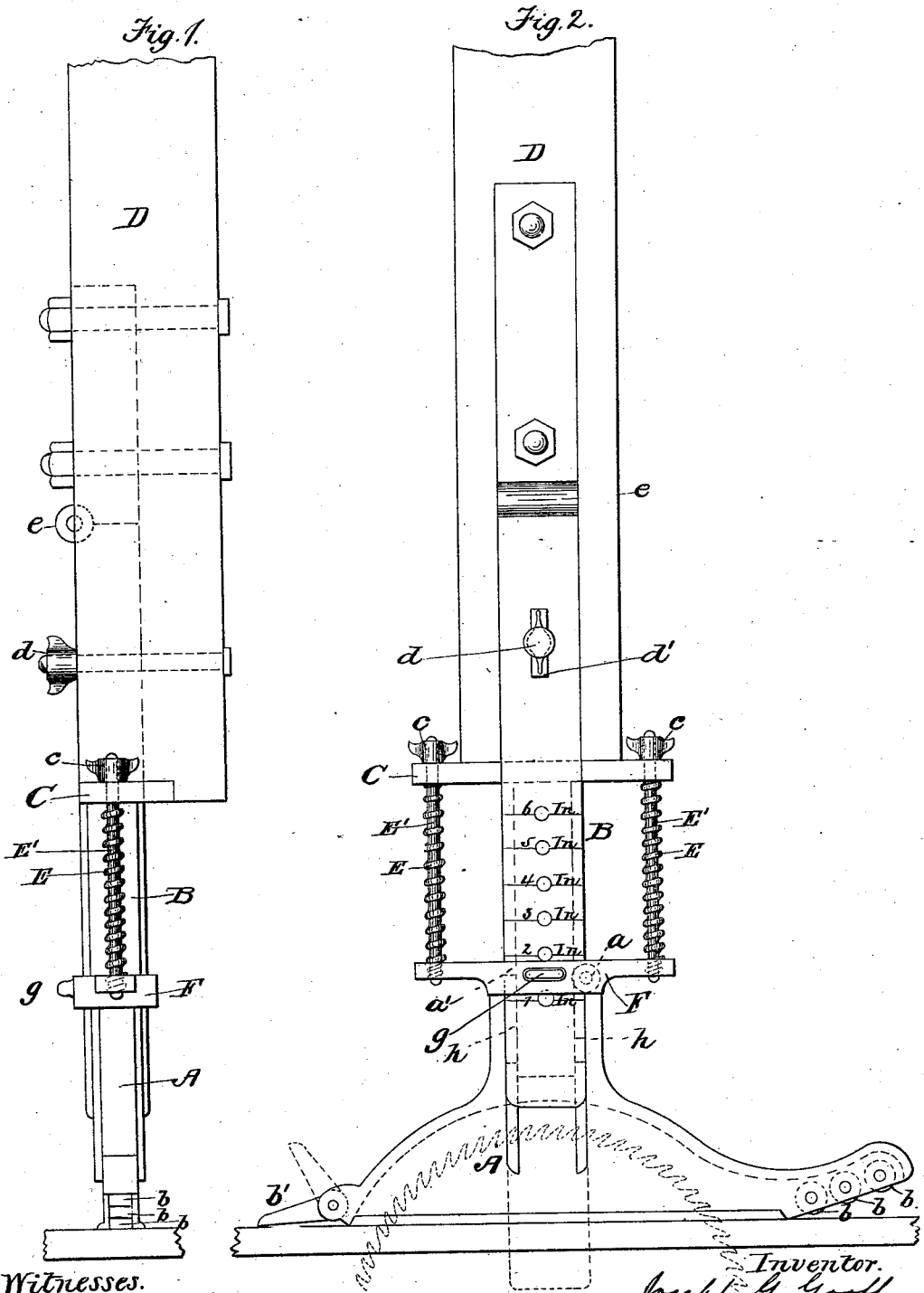

JOSEPH G. GROFF, OF CONNERSVILLE, INDIANA.

CIRCULAR-SAW GUARD.

SPECIFICATION forming part of Letters Patent No. 247,558, dated September 27, 1881.

Application filed August 4, 1881. (No model.)

*To all whom it may concern:*

Be it known that I, JOSEPH G. GROFF, of Connersville, in the county of Fayette and State of Indiana, have invented a new and Improved Shield for Circular Saws and Groovers; and I do hereby declare the following to be a full and exact description of the same, reference being had to the accompanying drawings, forming part of this specification, in which—

Figure 1 is a front view of my invention, and Fig. 2 an edge view of the same.

Similar letters of reference in the several figures indicate the same parts.

My invention has for its object to provide improved means for shielding circular saws and groovers while in operation, whereby to protect the operators from accidents; and to this end it consists in a novel device constructed as I will now proceed to describe.

In the drawings, A represents a shield or guard, having a recess within it, as shown by the dotted lines in Fig. 2, for the accommodation of the saw. This shield has connected to its upper end a cross piece or bar, F, and is adapted to be moved up and down upon a bifurcated staff, B, which passes through a vertical slot in the cross-bar and works in guides on the sides of the shield, as shown.

Grooves $h\ h$ are preferably formed in the lateral edges of the staff B, and into these grooves project suitable tongues or projections, $a'$, on the cross-bar F, and also an anti-friction roller, $a$, mounted in a recess in said bar. These grooves and the tongues and roller may be omitted, if desired, though I prefer to employ them, as they enable the shield to be adjusted more freely up and down upon the staff.

The staff is graduated, as shown in Fig. 2, and provided with a series of holes, with which engages a suitable holding-pin. By moving the shield up or down by means of a thumb-piece, $g$, and inserting the holding-pin into the proper hole, the shield can be held at any desired height.

One end of the shield is upturned or beveled and carries a series of anti-friction rollers, $b\ b\ b$, which operate to guide and direct the lumber and facilitate its passage under the shield to the saw. The opposite end of the shield has pivoted to it a dog or pawl, $b'$, which is raised by and rides upon the lumber as the latter comes from the saw, but drops down upon the table behind the lumber after it has passed by, and prevents it from returning back upon the saw.

The staff B is made in two parts, hinged together at $e$, and the upper part is let into and bolted or otherwise secured to a pendent post, D, supported from above or below the saw-table, as preferred. A vertical slot, $d'$, is made in the lower hinged portion of the staff, and through this slot projects a bolt secured to the post D, and carrying a thumb-nut, $d$. When the thumb-nut is turned as shown in Fig. 2, its wings stand opposite the slot, and the staff can then be swung outward and upward, so as to carry the shield away from the saw, the shield having, of course, been first adjusted high enough on the staff to clear the saw. The staff, when swung up, may be held elevated by the attachment of a pendent cord and hook, or a hooked rod or other contrivance, and while so held the saw may be easily adjusted or replaced by another. After it is swung down again into vertical position the staff may be again secured rigidly by making a quarter-turn of the nut, so as to bring its wings transversely across the slot.

Let into the under part of the post D is a cross-bar, C, the same being connected to the cross-bar F on the shield by rods E' E', carrying spiral springs E E and thumb-nuts $c\ c$. These last-mentioned parts are especially effective when the device is used in connection with a groover, the springs serving to give the pressure necessary to keep the material constantly in contact with the table while being operated upon by the grooving-tool.

The tension of the springs may be varied by adjusting the thumb-nuts $c\ c$.

The sides of the shield may be made solid, or one or more may be constructed of open-work, so as to enable the operator to see the saw.

In lieu of the pin for holding the shield at any desired height upon the staff, a cord may be attached to the top of the shield and passed thence over a pulley mounted within a recess in the staff, below the staff-pivot, to the outside of the staff, where it may have connected to it a counterbalance-weight. This weight will, of course, assist in raising the shield and in maintaining it where adjusted.

Having thus described my invention, what I claim as new is—

1. The combination of the staff, having the graduations and the series of holes, with the vertically-adjustable shield and the holding-pin, substantially as described, for the purpose specified.

2. The shield, having one of its ends upturned or beveled and provided with the series of anti-friction rollers, substantially as described.

3. The combination of the vertically-adjustable shield with the hinged part of staff, having the vertical slot, with the bolt projecting from the stationary post through said slot, and the winged thumb-nut on the outer end of said bolt, substantially as described.

4. The combination, with the staff having the grooves along its edges, of the vertically-adjustable shield, the slotted cross-bar F, and the projections, and the anti-friction roller on the cross-bar working into said grooves, substantially as described.

5. The combination of the shield, the cross-bars C and F, the rods connecting said cross-bars, the springs on the rods, and the adjusting-nuts, substantially as described.

JOSEPH G. GROFF.

Witnesses:
WILLIAM C. FORREY,
WILLIAM H. BECK.